Patented May 23, 1950

2,508,427

UNITED STATES PATENT OFFICE 2,508,427

ORE SEPARATION

Francis Keith Shelton, Boulder City, Nev., assignor to the United States of America as represented by the Secretary of the Interior No Drawing. Application September 6, 1944, Serial No. 552,851

6 Claims. (Cl. 75—119)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention comprises methods of separation of nickel and cobalt. Primarily it comprises the heating of the mixed carbonates of these metals at temperatures considerably below the generally accepted decomposition temperature of either of these metal carbonates for relatively long periods of time, with the result that the cobalt is largely converted to acid-insoluble compounds while the nickel is not substantially similarly affected and may be leached from the final product with dilute acids.

Heretofore, a great number of methods of separating these two metals have been proposed, but none have been fully satisfactory. The standard method of separating the two commercially is to precipitate the cobalt from the nickel by hypochlorites, U. S. Patents 354,941 and 1,195,211. However, the resulting product is never too satisfactory since the cobalt is contaminated with nickel to the degree of from one to three parts per hundred. This process is relatively costly also. One recent method is that of Caron, U. S. Patent 2,290,313. Other processes are described in U. S. Patents 1,557,879; 1,596,253; 1,365,358; and 1,928,340; and many other processes have been described.

Each process has its merits. The features of the hypochlorite process found objectionable are: (1) Incomplete separation of cobalt and nickel, except in very great dilution—sometimes as high as one pound of cobalt in 3,000 pounds of solution. (2) The relatively high cost of chlorine or hypochlorites for the precipitation. (3) The objectionable features of the use of chlorine from health and equipment corrosion and deterioration viewpoints. (4) To obtain a fairly efficient separation, the initial precipitate must be reworked one or more times by the same process. (5) Chlorine utilization is only fifty percent effective.

By my invention, certain of these objections are overcome: (1) The reagents used are relatively cheap. (2) Temperatures proposed are very cheaply and readily maintained. (3) The separation of a comparable order of the hypochlorite separation. (4) No health hazards or equipment corrosion is present. (5) The proposed method may be a means of giving a cheap, fair initial separation, yielding material readily separated thereafter by other methods. (6) Nickel is yielded in solution, aiding in its subsequent electrometallurgy. (7) Relatively small amounts of materials are handled during the decomposition. (8) The process is applicable over a wide ratio of cobalt to nickel—from very high cobalt to high nickel products without more than relatively small disadvantages to the decomposition.

Succinctly, my invention consists in heating the mixed carbonates of cobalt and nickel at an elevated temperature preferably about 200 degrees centigrade for relatively long periods of time, usually 7 to 10 days. The cobalt is largely rendered acid-insoluble by this treatment while the nickel salts in the residue are largely soluble in acids. The acid usually employed is kept at above a pH of 1.5 and preferably 2.0, and the leach continued until the soluble salts are extracted.

In the practice of my invention I ordinarily treat solutions containing cobalt and nickel (as well as manganese and other metals to be separated) with soda ash (ordinarily in solution) and separate the solids thrown down. I ordinarily also separate only those solids formed between definite pH limits. Their exact chemical composition is not known but herein is included in the term "mixed carbonates." However, I may employ the mixed carbonates prepared in other ways, for example by pyro methods or solid reaction methods. Too, I may employ the salts thrown down from cobalt and nickel containing solutions by bicarbonates, sesquicarbonates or other oxycarbonaceous precipitants. Again, I may employ mixed cobalt and nickel hydrated carbonates, hydroxy carbonates, bicarbonates, carborates, or the like.

Optionally, the mixed carbonates may be further pre-treated—for example, dried and reduced to minus 65 mesh. Water soluble salts are generally leached out before the decomposition. However, these are purely preliminary steps in relation to my invention.

In accordance with my invention, the mixed carbonates, held in suitable apparatus, are subjected to a regulated heat of about 200 degrees centigrade for a relatively long period of time, generally about 7 days. The heating may be continuous or intermittent, and the degree of heat may vary considerably. Temperatures as low as 125 degrees centigrade will yield considerable decomposition of the cobalt compounds to an acid-insoluble stage in the course of time—perhaps 20 to 40 days. The decomposition in actual tests at 150 degrees centigrade was 83.05 percent of cobalt rendered insoluble in 11 days; 89.83 percent of the cobalt carbonate was decomposed in 5 days at about 176 degrees centigrade; 79.90 percent of the cobalt in 13 days at 164 degrees centigrade; 97.37 percent in 7 days at 200 degrees centigrade ±20 degrees centigrade (intermittent heat), and shorter periods of time are needed for higher temperatures—the higher temperatures accelerate the decomposition of the nickel salts. Too, the period of decomposition is somewhat in proportion to the percentage of cobalt present in the mixed carbonates. The higher the cobalt content, ordinarily the longer the heating necessary. Even at low temperatures, e. g., 200 degrees centigrade a relatively large percentage of the cobalt salts apparently are decomposed in the first twenty-four hours. When less than one part of cobalt is present in 50 parts of nickel, two days' heating will provide sufficient decomposition to raise the ratio to above 200 parts of nickel to 1 of cobalt. The nickel salts may also decompose, but at a much slower rate, in this range. The upper limit of temperature usable in the process approximates 400 degrees centigrade, or perhaps 440 degrees centigrade. Brazs' "Thermal Decomposition of Carbonates," Journal Physical Chem., vol. 30, pages 680 to 693 (1926), treats this ready decomposition range. Above this temperature the carbonates enter the temperature range of quick decomposition, and for this reason the separation becomes very poor. It is my usual procedure to stay much below this temperature in order to provide a much better separation. Usually, I avoid going above 300 degrees centigrade, and preferably stay below 250 degrees centigrade.

Extraneous salts have an effect on the decomposition. When Glauber's salts are present in the decomposition product, the rate of decomposition of cobalt carbonates experimentally is reduced, sometimes by as much as 50 percent. This and other soluble salts, for this reason, are preferably removed from the carbonates prior to decomposition. It may be preferred to perform the decomposition in a plurality of states, heating a shorter time, removing the acid-soluble salts, re-precipitating the mixed carbonates from the solution and reheating the precipitated product. This process may be repeated a number of times. The presence of sulphates and perhaps other anions such as chlorides may form water-soluble cobalt salts under treatment conditions by chemical action during the decomposition, and for this reason they are preferably removed prior to my treatment.

While this process has primarily been described as a method of cobalt and nickel separation, it has been found that manganese oxycarbonaceous compounds such as manganese carbonate (perhaps hydrated) also decomposes in a like manner and can be utilized to separate this metal for each of the others under similar conditions. As as example of this, 28.5 grams of a hydrated (or hydroxy) manganese carbonate precipitated from manganese sulphate solutions by soda ash was 82.08 percent decomposed at 200 degrees centigrade in 14 days. Concurrently, a nickel cobalt carbonate product, weighing 45 grams and carrying 0.123 gram of manganese, was found to have 100 percent of the manganese decomposed at the end of 2, 8, and 14 days. (See Example 2, following.) This last constituted a very good separation for the nickel since at the end of the eighth day only 3.72 percent of the nickel was similarly decomposed. Iron carbonate is likewise decomposed to a certain degree in this range and this can be differentially separated from others by my process.

The calcined product is leached with dilute acid, generally sulphuric acid, but other mineral acids are not excluded. Any other acid yielding a pH below 6.0 and soluble nickel salts or salts which yield a pH of less than 3.0 in contact with the calcine and water, such as ammonium bisulphate, ferric chloride, or aluminum nitrate, which yields soluble nickel salts, can be substituted. The acid-soluble portions of the calcine are leached out and separated. Usually, I attempt to maintain a pH at above 1.5 and preferably in the neighborhood of 2.0. From direct experimental results, some small portions of the reacted cobalt are dissolved in acid of a pH of less than 0.5. The solution contains a much greater ratio of the nickel to cobalt than the original material treated by my process.

To hasten the decomposition, I may subject the material to vacuum during the decomposition. This step allows lowered temperatures and shorter times to be used than in the case of the normal pressures. Other methods to reduce the carbon dioxide pressures above the decomposition bed are also applicable. For example, absorption of the $CO_2$ in lye or lime, (ordinarily out of contact with the treated compounds, and usually outside the reaction chamber).

The solid residues after leaching with dilute acid contain an enriched cobalt product whose cobalt-nickel ratio is generally of the order of ten times that occurring in the original product and usually containing above 75 percent of cobalt in the original product. This is a highly satisfactory ratio on carbonates containing low percentage of cobalt. However, on higher ratios of cobalt the heretofore mentioned stage treatment may be necessary to raise this ratio and recoveries to commercial values.

No specification is made as to types of apparatus wherewith my invention may be carried into practice, since they are well known. Hot-air ovens, drying ovens and the like are applicable. The depth of the bed of decomposing material has a relationship to the rate of decomposition, but its effect is of engineering rather than of inventional nature. It is well to rabble the material regularly or intermittently during decomposition to secure more uniform results in the calcine.

The following illustrative examples show how my invention may be carried out, but it is not limited thereto. Parts and percentage composition are by weight unless otherwise indicated:

EXAMPLE 1

Four samples of various mesh sizes of a uniform head sample of a mixed cobalt and nickel carbonate, precipitated from the mixed sulphate solution by soda ash between the pH limits of 6.0 and 7.2, were heated at 230 degrees centigrade about 13 days. The calcines were leached with agitation to the noted final pH in dilutions of about 6:1 (with water calculated on the original head sample) with sulphuric acid added at intervals over a two-day period to maintain the pH to about 2.0. Table 1 presents the data secured.

TABLE NO. 1

*Decomposition of $CoCO_3$–$NiCO_3$ mixtures at 230° C.*

| Material Mesh | Final pH of Solution | Percentage Total Metal in Residue | | Cobalt-Nickel Ratio | |
|---|---|---|---|---|---|
| | | Co | Ni | Heads | Residues |
| −65 | 2.30 | 76.5 | 8.5 | 0.917 | 8.28 |
| −100 | 2.08 | 70.6 | 6.6 | 0.949 | 10.12 |
| −150 | 2.77 | 75.5 | 7.7 | 0.987 | 9.72 |
| −200 | 2.30 | 70.9 | 6.6 | 1.002 | 10.82 |

(Under similar conditions 46.5 percent of a chemically pure sample of $MnCO_3$ was rendered insoluble in acid of a final pH of 1.28.)

EXAMPLE 2

A uniform head sample of mixed cobalt and nickel carbonate, prepared by treating the mixed sulphate solutions of the two salts with soda ash solutions and utilizing the material precipitated between pH 6.4 and 7.0, was reduced to −65 mesh after air-drying, and heated for varying periods of time. Seven 45-gram samples were thus treated. The calcine so produced was then leached (in dilutions of about 10:1) with sufficient sulphuric acid added in stages covering two days to give the noted final pH. Table 2 gives the experimental factors. The heating was in an electrically heated oven and the materials were held in porcelain vessels. Temperatures were 200 degrees centigrade (variations from 186.5 degrees centigrade to 204.5 degrees centigrade).

On the 48, 192, and 336 hour tests, 0.125 grams of manganese were present, all of which were rendered acid-insoluble in the noted time. This represents a very good separation from the nickel.

TABLE NO. 2

*Time factor in $CoCO_3$–$NiCO_3$ decomposition*

| Hours Heated | Percent Original Sample Volatilized | Final pH of Solution | Percentage Total Metal in Residue | | Cobalt-Nickel Ratios | |
|---|---|---|---|---|---|---|
| | | | Co | Ni | Heads | Residues |
| 48 | 44.5 | 2.72 | 44.85 | 5.65 | 1.178 | 9.36 |
| 96 | 44.4 | 2.35 | 41.09 | 3.42 | 1.343 | 16.14 |
| 144 | 46.7 | 2.97 | 53.65 | 3.73 | 1.404 | 20.45 |
| 192 | 46.7 | 2.84 | 56.45 | 3.72 | 1.368 | 20.78 |
| 240 | 47.2 | 2.45 | 56.98 | 1.90 | 1.238 | 37.23 |
| 288 | 46.7 | 2.35 | 60.00 | 4.64 | 1.450 | 18.77 |
| 336 | 46.4 | 1.80 | 59.86 | 4.26 | 1.405 | 19.83 |

EXAMPLE 3

A mixture of 10 grams of cobalt carbonate and 40 grams of nickel carbonate (commercial) was heated at about 170 degrees centigrade to 220 degrees centigrade, generally at about 200 degrees centigrade for seven days intermittently. I then leached the residue with a total of 16.8 milliliters of 1.84 specific gravity sulphuric acid in 400 milliliters of solution to a final pH of 1.75. Of this cobalt 63.7 percent was acid insoluble, while 99.2 percent of the nickel remained acid-soluble.

EXAMPLE 4

A mixture containing 13.87 grams of cobalt and 33.83 grams of nickel, compounded as the co-precipitated carbonates, was carefully dried at 105 degrees centigrade to a weight of 136.9 grams. This was reduced to minus 200 mesh and heated for about 11 days. Table 3 gives the rate of decomposition of the carbonates. A 50-gram sample of the calcine was titrated with 18.05 cc. of concentrated sulphuric acid to a final pH of 1.64, there being separated from this solution 365 cc. of filtrate and 5.2 grams of residue. The residue contained 43.24 percent of cobalt and 3.41 percent of the nickel. This was heated in a constant temperature oven of standard laboratory design, and the materials were contained in porcelain dishes. The cobalt and nickel in the solution was later reprocessed by precipitating them together with soda ash solutions and reheating under experimentally identical conditions. After heating for eleven days, 67.5 percent of the cobalt in the solution and only 2.35 percent of the nickel was found to be acid-insoluble in a bath of final pH of 2.35.

TABLE NO. 3

*Rate of decomposition of mixed carbonates*

| Duration of Test in Hours | Temperature, °C. | Grams Calcine | Loss of Wt., Grams | Per cent Loss of Wt. |
|---|---|---|---|---|
| 0.00 | 205 | 136.9 | 0.0 | 0.0 |
| 2.75 | 205 | 129.8 | 7.1 | 5.2 |
| 16.25 | 203 | 128.9 | 8.0 | 5.8 |
| 24.5 | 203 | 128.7 | 8.2 | 6.0 |
| 41.5 | 203 | 128.3 | 8.6 | 6.3 |
| 90.75 | 203.5 | 127.2 | 9.7 | 7.1 |
| 112.25 | 204 | 127.0 | 9.9 | 7.2 |
| 136.25 | 204 | 126.6 | 10.3 | 7.5 |
| 161 | 198 | 126.8 | 10.1 | 7.4 |
| 185.5 | 202 | 126.7 | 10.2 | 7.5 |
| 208.5 | 198 | 126.5 | 10.4 | 7.6 |
| 256 | 204 | 126.4 | 11.5 | 8.4 |

EXAMPLE 5

To demonstrate the advantages of removing the soluble salts, a co-precipitated nickel and cobalt carbonate sample was divided. One sample washed free of the soluble entrained salts, and then both were air-dried and reduced to minus 200 mesh. They were thereupon heated at about 203 degrees centigrade (range 198 degrees centigrade to 205 degrees centigrade), for about 9 days. Both were treated in about fifteen parts of water with sulphuric acid to a final pH of 1.30 for the unleached and 1.96 for the leached sample. In the unleached sample, there was 16.64 percent of the cobalt and only 0.57 percent of the nickel found to be acid-insoluble (the acid leach solution contained 13.48 grams per liter of sodium), while in the leached sample (the acid leach solution contained 0.82 grams per liter sodium), 83.54 percent of the cobalt and only 1.36 percent of the nickel was found acid-insoluble. The cobalt-nickel ratio, in the initial sample, was 1.24:1. The cobalt-nickel ratio in the soluble-salt-free test residue was increased to 63.0:1. The sodium salt removed by washing was chiefly sodium sulphate, although some sodium carbonate and other soluble salts were also present. The sodium sulphate results chiefly from reacting the cobalt and nickel sulphates with soda ash to yield the sodium sulphate as a by-product.

EXAMPLE 6

To explore the variations presents in the decomposition products, from high cobalt to nickel ratios in the mixed carbonates, a series of seven tests were made. A cobalt sulphate solution, containing about 16.8 grams per liter (and probably some nickel), was prepared. A sample of chemically pure solid $NiSO_4.7H_2O$ was prepared. To 500 milliliters of the cobalt sulphate solution was added $50 \div 2(n-1)$ grams of the $NiSO_4.7H_2O$, ($n=1,2,3,4,5,6,$ and 7), and the $NiSO_4.7H_2O$ allowed to dissolve. To this solution, sufficient soda ash solution, (24.0° Bé.), to raise the pH to 6.0 was added and the precipitate filtered off and rejected. More of the soda ash solution was then added to the filtrate to bring the pH to 7.2, and the precipitate removed and very thoroughly washed. This last precipitate was then dried, ground through 65 mesh, placed in porcelain evaporating dishes, and heated for about ten days. The temperature employed averaged about 192 degrees centigrade, with extreme variations from 180 degrees centigrade to 210 degrees centigrade. The calcine was placed in about 200 milliliters of distilled water, and sulphuric acid added to the pulp, from time to time, in order to keep the solution at about a pH of 2.0. This leaching took about forty-eight hours. Table 4 presents the data secured.

TABLE No. 4
*Tests of cobalt-nickel separation*

| Test | Final pH of Leach Solution | Cobalt and Nickel Ratios | | Percent Total Metal in Residue | |
|---|---|---|---|---|---|
| | | Heads | Residues | Cobalt | Nickel |
| 1 | 1.49 | 0.917 | 17.37 | 58.6 | 3.1 |
| 2 | 1.95 | 1.713 | 11.10 | 64.6 | 9.9 |
| 3 | 1.57 | 3.27 | 12.81 | 59.05 | 15.0 |
| 4 | 1.52 | 5.76 | 28.78 | 49.65 | 9.9 |
| 5 | 1.50 | 9.47 | 19.40 | 67.8 | 33.0 |
| 6 | 1.43 | 14.18 | 18.90 | 85.05 | 63.9 |
| 7 | 1.61 | 16.74 | 36.50 | 63.9 | 29.3 |

EXAMPLE 7

To explore the inverse of Example 6, i. e., high nickel to cobalt ratios in the mixed carbonates, a series of eight tests were made, using the same samples of $NiSO_4.7H_2O$ and cobalt solution. Fifty grams of the $NiSO_4.7H_2O$ were dissolved in 500 milliliters of distilled water and $500 \div 2(n-1)$ milliliters of the cobalt sulphate solution added in which $n=1,2,3,4,5,6,7,$ and 8. To this solution, sufficient of the soda ash solution to bring the pH to 7.2 was added. The precipitate was filtered out, thoroughly washed, air-dried, ground to 65 mesh, placed in porcelain dishes and heated in an electric oven for ten days. Temperature ranged from 193 degrees centigrade to 220 degrees centigrade and averaged 200.7 degrees centigrade. The calcine was placed in about 250 milliliters of distilled water, and the indicated number of milliliters of $H_2SO_4$ (1.84 sp. gr.) added over a period of 72 hours to give a leach solution of the indicated final pH. Table 5 gives the data secured.

TABLE No. 5
*Tests of cobalt-nickel separation*

| Test | cc. $H_2SO_4$ in Leach | Final pH of Leach Solution | Nickel-Cobalt Ratios | | Percent Total Metal in Solution | |
|---|---|---|---|---|---|---|
| | | | Heads | Solutions | Cobalt | Nickel |
| 1 | 10 | 2.72 | 1.967 | 6.33 | 30.1 | 97.18 |
| 2 | 11 | 1.88 | 5.57 | 11.86 | 46.6 | 99.30 |
| 3 | 10 | 1.99 | 12.52 | 17.25 | 71.73 | 98.78 |
| 4 | 10 | 2.32 | 11.06 | 20.23 | 53.15 | 99.04 |
| 5 | 11 | 1.48 | 21.97 | 36.33 | 60.2 | 99.47 |
| 6 | 10 | 1.78 | 13.41 | 16.88 | 79.2 | 99.63 |

What is claimed is:
1. A method of separating cobalt and nickel compounded as the mixed carbonates which comprises calcining such mixed carbonates at a temperature of about 200° C., leaching the nickel from the calcine with a dilute solution of an acid capable of forming soluble nickel salts, and separating the resulting nickel solution from the cobalt enriched residue.

2. A method of separating the carbonates of cobalt and nickel which comprises heating such a mixture to about 200 degrees centigrade, leaching the calcine with sulphuric acid in solution maintained at a pH of about 2.0, and separating the liquid from the solids.

3. In a method of separating cobalt from nickel compounded as the mixed insoluble carbonates, the steps which comprise heating such a mixture to an elevated temperature at which slow evolution of carbon dioxide begins but below the instantaneous decomposition temperature of any individual constituent in the mixture, continuing the said heating at approximately constant temperature until the weight of the treatment mixture becomes substantially constant, then treating the resulting mixture with an acidic solution, at a pH between pH 1.5 and pH 6.0, of a substance normally capable of forming soluble cobalt and nickel compounds, and removing and recovering an insoluble residue containing a substantially greater percentage of cobalt than the original mixture.

4. The process of claim 3, wherein the insoluble carbonate mixture is washed with water to remove soluble salts prior to the heat-treatment step.

5. The process of claim 3, wherein the heat-treatment is conducted at a temperature below 250° centigrade.

6. The process of claim 3, wherein the heat treatment is conducted at a temperature of approximately 200° centigrade and the acid treatment is carried out with dilute sulfuric acid at a pH of approximately pH 2.

FRANCIS KEITH SHELTON.

REFERENCES CITED

The following references are of record in the file of this patent:

UNITED STATES PATENTS

| Number | Name | Date |
|---|---|---|
| 2,142,926 | Van Es | Jan. 3, 1939 |

FOREIGN PATENTS

| Number | Country | Date |
|---|---|---|
| 848 | Great Britain | of 1861 |
| 853 | Great Britain | of 1877 |

OTHER REFERENCES

Chemical Abstracts, vol. 29, 1935, page 7780.